United States Patent [19]

Chikuma et al.

[11] Patent Number: 5,061,038
[45] Date of Patent: Oct. 29, 1991

[54] FIBER TYPE WAVELENGTH CONVERTER

[75] Inventors: Kiyofumi Chikuma; Sota Okamoto, both of Saitama, Japan

[73] Assignee: Pioneer Electronic Corporation, Tokyo, Japan

[21] Appl. No.: 640,162

[22] Filed: Jan. 11, 1991

[30] Foreign Application Priority Data

May 19, 1990 [JP] Japan ................................ 2-129400

[51] Int. Cl.⁵ ........................... G02B 6/22; G02F 1/37
[52] U.S. Cl. .................................. 359/328; 359/332; 385/122; 385/127
[58] Field of Search ........................... 307/425–430; 350/96.12, 96.15, 96.18, 96.19, 96.29, 96.30, 96.33, 96.34

[56] References Cited

U.S. PATENT DOCUMENTS

| | | | |
|---|---|---|---|
| 4,830,447 | 5/1989 | Kamiyama et al. | 350/96.12 |
| 4,838,638 | 6/1989 | Kamiyama et al. | 350/96.19 |
| 4,893,888 | 1/1990 | Okazaki et al. | 350/96.12 |
| 4,909,595 | 3/1990 | Okazaki et al. | 350/96.29 |
| 4,909,596 | 3/1990 | Okazaki et al. | 350/96.29 |
| 4,923,277 | 5/1990 | Okazaki et al. | 350/96.29 |
| 4,952,013 | 8/1990 | Harada et al. | 350/96.30 |
| 4,962,993 | 10/1990 | Okamoto et al. | 350/96.29 |
| 4,991,931 | 2/1991 | Harada et al. | 350/96.29 |

*Primary Examiner*—John D. Lee
*Attorney, Agent, or Firm*—Foley & Lardner

[57] ABSTRACT

A fiber type wavelength converter formed of a core and a clad surrounding the core, the core consisting of a first core formed of a nonlinear crystalline material, for which, when the refractive index to the primary light incident on and guided by the core is represented by $\eta G^\omega$ and the refractive index to a converted second harmonic is represented by $\eta G^{2\omega}$, the relationship $\eta G^{2\omega} > \eta G^\omega$ holds, and a second core formed of optical glass covering the first core. Specifically, the optical glass for the second core is such optical glass, for which, when the refractive index thereof to the primary light incident thereon is represented by $\eta GL^\omega$, the relationship $$0.9 < \frac{\eta^\omega_{GL}}{\eta_G^\omega} < 1.1$$

holds.

2 Claims, 2 Drawing Sheets

FIBER TYPE WAVELENGTH CONVERTER

BACKGROUND OF THE INVENTION

1. Field of the Invention

The present invention relates to an optical fiber type wavelength converter using Cherenkov radiation type of phase matching.

2. Description of the Prior Art

There is known a light wavelength converter in the form of an optical fiber (hereinafter referred to as "fiber") structured of a nonlinear crystalline core covered with a clad and using Cherenkov radiation type of phase matching. Such light wavelength converter is also known as an optical fiber type second harmonics generator (hereinafter referred to as "SHG"). Since, in the Cherenkov radiation type, second harmonic wave (hereinafter referred to as "SH wave") can be generated with phase matching of light performed virtually automatically, SHG is used as a short wavelength light source and the like.

As shown in FIG. 1, a short wavelength light source comprises a semiconductor laser 1, a coupling lens 2 for converging beam of light radiated from the semiconductor laser thereby introducing the light into an SHG through its side face, and SHG 3 whose core is made of a nonlinear crystal, and an axicon 4 for adjusting the wave front of an SH wave converted by and radiated from the wavelength converter thereby turning the SH wave into a parallel beam of light.

FIG. 2A and FIG. 2B are conceptual diagrams of such SHG. The SHG is composed of a cylindrical core 10 and a cylindrical clad layer 20 concentrically surrounding the core 10.

Referring to FIG. 2A, when a fundamental mode propagates through the core 10 having an effective refractive index $N(\omega)$ from left to right in the diagram, a nonlinear polarization wave generating an SH wave also propagates at the same phase velocity $C/N(\omega)$ (C: light velocity). Let it be supposed now that the nonlinear polarization wave generates an SH wave at the point A in the diagram in the direction at an angle $\theta$ with the waveguide direction and, after a unit time, it generates an SH wave again at the point B in the direction $\theta$ the same as before. If, for example, the SH wave generated at the point A propagates through the clad layer 20 and reaches the point C after the unit time has passed and if the angle $\theta$ is such an angle to allow AC to cross BC at a right angle, then, the wave front of the SH wave generated by the nonlinear polarization wave at the interval AB becomes BC, which means that a coherent SH wave has been generated.

The SH wave generated as described above propagates as a clad mode repeating total reflection at the boundary surface between the clad layer 20 and the air as shown in FIG. 2B and is emitted from the end face of the fiber in the form of a cone determined by the angle $\theta$. The wave front of the thus emitted wave constitutes a form of cone with the center axis of the fiber as its axis.

Such an SHG as shown in FIGS. 2A and 2B that has a length allowing the generated SH wave to be reflected by the boundary surface between the clad and the air and returned to the core again has hitherto been considered good. This is because it has been considered that an SH wave returned to a point interferes with an SH wave generated at the point and, as a result, they are extinguished. Since the conversion efficiency has been considered proportional to the fiber length, there has been used a fiber with a larger clad diameter for obtaining enhanced conversion efficiency.

Further, since it is considered that an enhancement of conversion efficiency can be obtained if the nonlinearity constant of the nonlinear material filled in the core is large, there has been an attempt, as a means to improve the wavelength conversion efficiency of such SHG, to select an optimum core diameter and select an optimum material for the clad glass.

However, fundamentally, the conversion efficiency largely depends on the degree of refractive dispersion of materials and, hence, there has been a limit to the enhancement of the efficiency attainable by the conventional means.

SUMMARY OF THE INVENTION

An object of the present invention is to provide a fiber type SHG capable of sufficiently exhibiting the ability of a nonlinear material filled in the core thereby enhancing the conversion efficiency.

The SHG of the present invention comprises a core and a clad surrounding the core, of which the core is made up of a first core formed of a nonlinear material, for which, when refractive index for the fundamental light introduced into and guided through the core is represented by $\eta_G{}^\omega$, and the refractive index for the second harmonic obtained by conversion is represented by $\eta_G{}^{2\omega}$, the relationship $\eta_G{}^{2\omega} > \eta_G{}^\omega$, holds, and a second core formed of optical glass surrounding the first core.

According to the present invention, the overlap integral of the electric field distribution of the SH wave and the excited nonlinear polarization is made large so that the wavelength conversion efficiency can be enhanced.

DETAILED DESCRIPTION OF THE PREFERRED EMBODIMENT

An embodiment of the present invention will be described below in detail with reference to the accompanying drawings.

Figure 1:
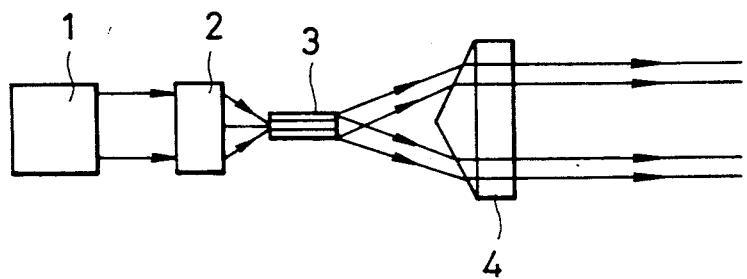
FIG. 1 is a schematic diagram of a short wavelength light source using an SHG.
Figure 2A:
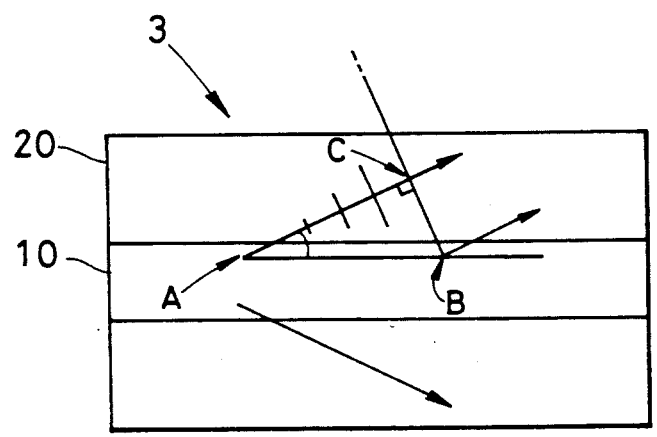
FIGS. 2A and 2B are schematic sectional views of the SHG.
Figure 2B:
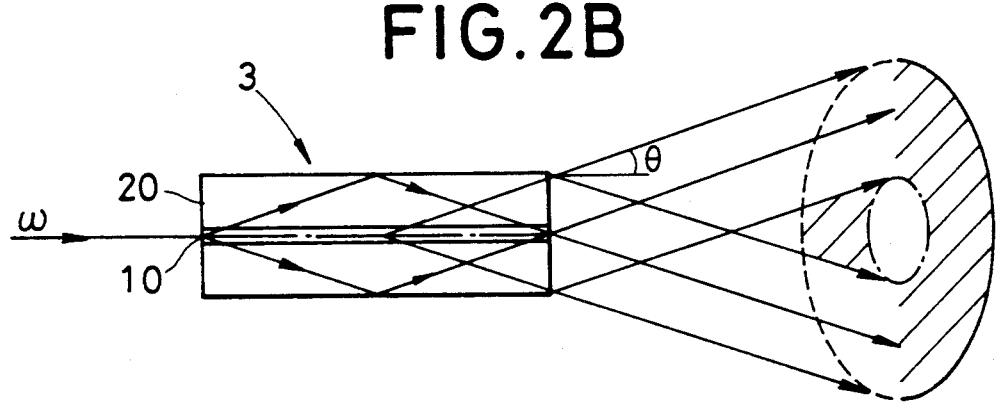
Figure 3:
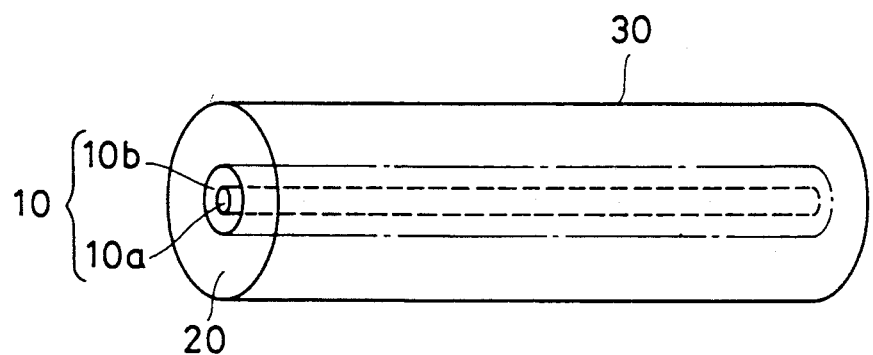
FIG. 3 is a perspective view of an SHG according to the present invention.

FIG. 3 is a perspective view of an SHG of an embodiment according to the present invention. The SHG is made up of a cylindrical core 10 in the center and a cylindrical clad layer 20 concentrically surrounding the core. The core 10 is composed of a first core 10a, in the center, formed of a nonlinear crystalline material, for which, when the refractive index for the incident primary light is represented by $\eta_G{}^\omega$, and the refractive index for the second harmonic obtained by conversion is represented by $\eta_G{}^{2\omega}$, the relationship $\eta_G{}^{2\omega} > \eta_G{}^\omega$ holds, and a cylindrical second core 10b, surrounding the first core, formed of an optical glass whose refractive index, $\eta_{GL}{}^\omega$, is close to $\eta_G{}^\omega$, or virtually equal thereto.

Such SHG of the present invention has been devised on the basis of the knowing that the SH wave can be expressed as an overlap of discrete modes propagating through the clad, which has been obtained as a result of analyses of the electric field in fibers whose clad is limited in diameter as in practical fibers, with the existence of boundary in a conventional SHG made up of a clad and a core of a single material taken into consideration. There are present a log of equivalent refractive indexes for such modes, being slightly different in value. Energy is transferred to the mode out of such modes most close to the nonlinear polarization wave in propagation velocity and the SH wave is allowed to propagate. This behavior is quite similar to that in an SHG in which mode-mode phase matching takes place, that is, an SH wave performs phase matching with the primary light propagating through and guided by the core. In order to allow existence of the mode for the secondary light propagating through the core, with an equivalent refractive index to the equivalent refractive index for the guided primary light, in the case where such mode-mode phase matching takes place, the core diameter and the refractive index must be controlled very much rigidly.

As to a conventional SHG made up of a clad and a core of a single material, we made analyses of SH wave outputs in the following way, with the boundary between the core and the clad and, further, the boundary between the clad and the air taken into consideration.

Taking z-axis along the direction of wave guiding and denoting the core radius by a and the length of the crystal by L, it is assumed that an $LP_{01}$ mode is guided at a propagation constant $\beta$. The nonlinear polarization $P^{NL}$ excited under the described conditions is defined by the following expression $$P^{NL} = \epsilon_0 d C J_0^2 (Ur)^2 \exp(-i2\beta Z)$$

were
C: constant, $U^2 = \omega^2 \text{ U O } \epsilon_8 - \beta^2$,
$\epsilon_8$: dielectric constant of the core.

The SH wave $E^{2\omega}(r)$ propagating through the core is expressed, using the dielectric constant $\epsilon_1$ of the crystal and the Green function $G^D(r, r')$ with the boundaries taken into consideration, as $$E^{2\omega}(r) = i2\omega^2 \mu_0 \epsilon_0 dC \times \int_{-\infty}^{\infty} \int_0^a G^D(r,r') J_0^2 (Ur') r' dr' \times$$

$$\frac{\sin[(2\beta - \lambda)L/2]}{(2\beta - \lambda)} \exp(-i\lambda z) d\lambda$$

The function $G^D(r, r')$ is expressed, using the Green function G (r, r') for the entire space and an arbitrary function $A(\lambda)$, as $$G^D(r,r') = G(r, r') + A(\lambda) J_0(r\zeta) J_0(r'\zeta)$$

The function G (r, r') by $$G(r,r') = \begin{cases} H_0^{(1)}(r\zeta) J_0(r'\zeta) & (r > r') \\ H_0^{(1)}(r'\zeta) J_0(r\zeta) & (r < r') \end{cases}$$

In the above expression, $H_0^{(1)}$ and $J_0$ are zero-order Hankel function of first type and Bessel function, and it is set $\zeta^2 = 4\omega^2 \text{ u O } \epsilon_1 - \lambda^2$.

The power $P^{2\omega}$ is obtained from the following expression:

$$P^{2\omega} = 8\pi\omega^3 \mu_0 \epsilon_0^2 d^2 C^2 \times \int_{-\infty}^{\infty} F(\lambda) \frac{\sin^2[(2\beta - \lambda)L/2]}{(2\beta - \lambda)^2} d\lambda \quad (1)$$

$$F(\lambda) = \text{Real}\left\{ iG(\lambda) \times \left| \int_0^a J_0(r\zeta) J_0^2 (Ur) r dr \right|^2 \right\}$$

(i: imaginary unit)

The function $G(\lambda)$ can be determined from boundary conditions, that is, denoting the dielectric constant of the clad by $\epsilon_2$ and the dielectric constant of air by $\epsilon_0$, and, defining $\eta$ and $\xi$ by the following expressions, $$\eta^2 = 4\omega^2 \text{ u O } \epsilon_2 - \lambda^2$$

$$\zeta^2 = 4\omega^2 \text{ u o } \epsilon_o - \lambda^2$$

if functions $A(\lambda)$, $A'(\lambda)$, $B(\lambda)$, $C(\lambda)$, $C'(\lambda)$, $D(\lambda)$ are defined as $$A(\lambda) = \eta N_0(a\zeta) J_1(a\eta) - \zeta N_1(a\zeta) J_0(a\eta)$$

$$A'(\lambda) = \eta J_0(a\eta) J_1(a\eta) - \zeta J_1(a\zeta) J_0(al\zeta) J_0(a\eta)$$

$$B(\lambda) = \xi N_0(b\eta) K_1(b\xi) - \eta N_1(b\eta) K_0(b\xi)$$

$$C(\lambda) = \xi N_0(a\eta) J_1(a\eta) - \eta N_1(a\eta) J_0(a\xi)$$

$$C'(\lambda) = \xi N_0(a\eta) N_1(a\xi) - \eta N_1(a\eta) N_0(a\xi)$$

$$D(\lambda) = \xi J_0(b\eta) K_1(b\xi) - \eta J_1(b\eta) K_0(b\xi)$$

we can obtain $$G(\lambda) = -\frac{A(\lambda)B(\lambda) + C(\lambda)D(\lambda)}{A'(\lambda)B(\lambda) + C'(\lambda)D(\lambda)}$$

The function $G(\lambda)$ is a function having a pole $\lambda_j$ of the first order on the real axis, and the power of the SH wave expressed by expression (1) can be represented by residues at a large number of such poles.

More specifically, $G(\lambda)$ is a function having singular points at $\lambda = \lambda j$ (j=1, 2, . . .) and if the residues at the singular points are represented by $\text{Res}G(\lambda j)$, then the power is expressed as $$P^{2\omega} = 8\pi^2 \omega^3 \mu_0 \epsilon_0^2 d^2 C^2 \times$$

$$\sum_j \text{Res}G(\lambda_j) \frac{\sin^2[(2\beta - \lambda j) - j)L/2]}{(2\beta - \lambda j)^2} \times$$

$$\left| \int_0^a J_0(r\zeta_j) J_0^2 (Ur) r dr \right|^2$$

(where $\zeta_j^2 = 4\omega^2 \mu_0 \epsilon_1 - \lambda_j^2$)

The discrete poles just constitute the propagation constant of the SH wave propagating through the clad. Namely, it is known that the SH wave propagates as clad modes propagating through the clad with the propagation constants $\lambda_j$ and its power is expressed as the sum total of the powers of these modes.

The power of the SH wave becomes a maximum when the propagation constants of the nonlinear polarization wave propagating through the core and the clad mode propagating through the clad are equal, that is, when the phase matching condition is satisfied. In other words, when the relationship $2\beta = \lambda_j$ is attained, a large power can be obtained.

In order to enhance the conversion efficiency further, it becomes necessary to enlarge the value of the following integral, which has a great influence on the power:

$$\int_0^a J_0(r\zeta)J_0^2(Ur)\,rdr$$

This is an overlap integral of the nonlinear polarization $\epsilon_0 dCJ_0^2(Ur)\exp(-i2\beta Z)$ and the electric field distribution $J_0(r\zeta)$, and we obtain $$\zeta^2 = (2k)^2[\eta_G^{2\omega} - \eta_{eff}^2]$$

$$U = k\sqrt{\eta_G^\omega - \eta_{eff}^2}$$

$\eta_G^{2\omega}$: G Refractive index of the SH wave to the core
$\eta_G^\omega$: Refractive index of the core to the fundamental (primary light).
$\eta_{eff}$: Equivalent refractive index for the $LP_{01}$ mode of the fundamental propagating through the core.

In order to make the value of the integral larger, it is necessary to set the value of $\eta_{eff}$ as close to the value $\eta_G^{2\omega}$, as possible. However, $\eta_{eff}$ is smaller than $\eta_G^\omega$ and, hence, in a material with a large degree of refractive dispersion, $\eta_{eff}$ cannot be set so close to $\eta_G^{2\omega}$ and the overlap integral cannot be made so large. To enhance the efficiency, it becomes necessary to use a material with a smaller degree of refractive dispersion or use such a type as $d_{23}$ and $d_{31}$ in which polarization of the fundamental and polarization of the secondary light (SH wave) are different, and select the crystalline orientation in which the difference between and $\eta_G\omega$ and $\eta_G^{2\omega}$ is small.

Of organic nonlinear materials, the one represented by a nonlinear tensor $d_{ii}$ is pointed out to have the possibility of providing a large nonlinear optical constant (of the second order). Supposing now that $d_{11}$ is the maximum tensor component, if an SHG utilizing that tensor component for wavelength conversion, it means that refractive indexes $\eta_x^\omega$, $\eta_x^{2\omega}$ in the x-direction of the dielectric axis of the crystal are utilized. However, such material has a large degree of refractive dispersion and this relationship holds:

$$\eta_x^{2\omega} > \eta_x^\omega$$

Therefore, the overlap integral of $$\int_0^a J_0(\zeta r)J_0^2(Ur)\,rdr$$

does not become large and, consequently, the efficiency is not enhanced even if the nonlinear constant is large.

Therefore, we have constructed a core of a nonlinear material as a first core in the center and an optical glass material as a second core surrounding the first core.

Figure 4A:
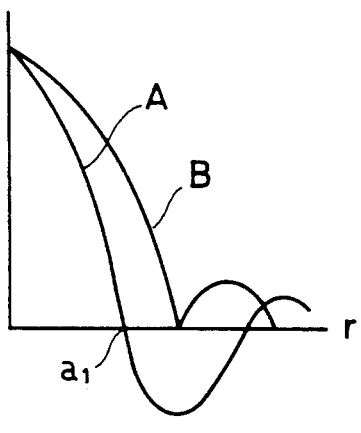
FIGS. 4A and 4B are graphs showing overlap integrals in a conventional SHG.

When the radius of the first core of a nonlinear material is denoted by $a_1$ and the radius of the second core of a glass material is denoted by $a_2$, $J_0(\xi r)$ is represented by the function indicated by A in the graph of FIG. 4A, which becomes negative when $a_1$ is exceeded. $J_0^2(Ur)$ becomes a function indicated by B.

Figure 4B:
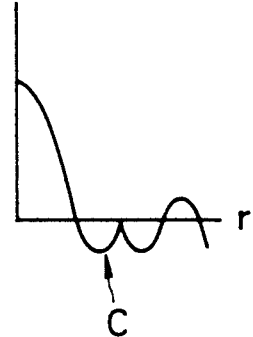

Product of these functions, as shown in FIG. 4B, is expressed as $$\int_0^a J_0(\zeta r)J_0^2(Ur)\,rdr = \int_0^{a_1} J_0(\zeta r)J_0^2(Ur)\,rdr + \int_{a_1}^{a_2} J_0(\zeta r)J_0^2(Ur)\,rdr \quad (2)$$

of which the second term on the right-hand side is negative and there is produced the negative portion indicated by C in FIG. 4B.

Within the range $0 < R < a_1$ of the first core, the nonlinear polarization is proportional to $\epsilon_0 dCJ_0^2(\zeta r)$, but within the range $a_1 < r < a_2$ of the second core, no nonlinear polarization occurs because it is formed of glass.

Figure 5A:
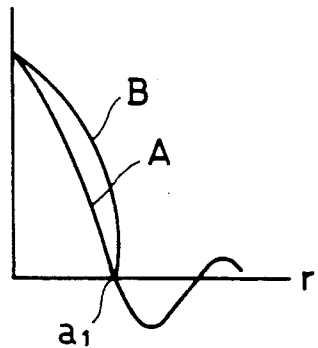
FIGS. 5A and 5B are graphs showing overlap integrals in an SHG of the present invention.
Figure 5B:
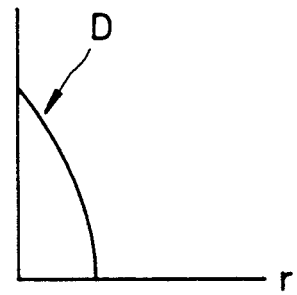

When the second core is formed of glass, the second term on the right-hand side of expression (2) becomes 0 and $J_0(\zeta r)$, $J_0^2(Ur)$ respectively become as indicated by A, B in FIG. 5A and the product of these functions becomes as shown in FIG. 5B and the total integral D becomes large.

In the above, $$a_1 = \frac{2.4}{\zeta}$$

In the above described embodiment, the second core is formed of optical glass whereby nonlinear polarization is suppressed from occurring. It is preferred that such optical glass has a refractive index which, when the refractive index to the incident primary light is represented by $\eta_{GL}^\omega$, is within the range $0.9 < \eta_{GL}^\omega/\eta_G^\omega < 1.1$, that is, both the indexes are virtually equal. This is for making the effect of the electric field due to existence of the second core negligible.

Thus, by analyzing the electromagnetic field with the existence of the boundary surface between the clad and the core taken into consideration, we have found that the SH wave conversion efficiency is expressed by the overlap integral of the nonlinear polarization excited by the fundamental and the electric field distribution of the SH wave and that the conversion efficiency can be enhanced by making the value of the overlap integral larger. It is pointed out that the diagonal component of nonlinear tensor $d_{11}$ has the possibility of making the nonlinear tensor for an organic nonlinear material larger. Hence, when it is attempted to achieve wavelength conversion using such diagonal component, it means that the refractive index of the same dielectric axis is used for the primary light and the secondary light.

Nonlinear materials have a large degree of refractive dispersion and $\eta_G^{2\omega}$ becomes considerably larger than $\eta_G^\omega$. Hence, the overlap integral does not become large. By forming the core in the double structure of the nonlinear crystalline material in the center and an optical glass material surrounding the core as in the present invention, the overlap integral in the power $P^{2\omega}$ of the SH wave can be made larger.

According to the present invention as described in the foregoing, in a fiber type wavelength converter formed of a core and a clad covering the core, the core is formed of a first core of a nonlinear material, for which, when the refractive index for the primary light guided by the core is represented by $\eta_G^\omega$ and the refractive index to the converted wavelength of the core is expressed by $\eta_G^{2\omega}$, the relationship $\eta_G^{2\omega} < \eta_G^\omega$ holds, and a second core, surrounding the first core, which preferably has a refractive index virtually equal to $\eta_G^\omega$. Hence, the overlap integral of the electric field distribution of the SH wave and the excited nonlinear polarization can be made larger and the wavelength conversion efficiency can be enhanced.

What is claimed is:

1. A fiber type wavelength converter formed of a core and a clad surrounding the core, said core consisting of a first core formed of a nonlinear crystalline material, for which, when the refractive index to the primary light incident on and guided by said core is represented by $\eta_G^\omega$ and the refractive index to a converted second harmonic is represented by $\eta_G^{2\omega}$, the relationship $\eta_G^{2\omega} > \eta_G^\omega$ holds, and a second core formed of optical glass covering said first core.

2. A fiber type wavelength converter according to claim 1 wherein said optical glass is such optical glass, for which, when the refractive index thereof to said primary light incident thereon is represented by $\eta_{GL}^\omega$, the relationship $$0.9 < \frac{\eta_{GL}^\omega}{\eta_G^\omega} < 1.1$$

holds.

* * * * *